N. DEMERS.
LOOM TEMPLE.
APPLICATION FILED SEPT. 26, 1910.
995,333.
Patented June 13, 1911.
2 SHEETS—SHEET 1.
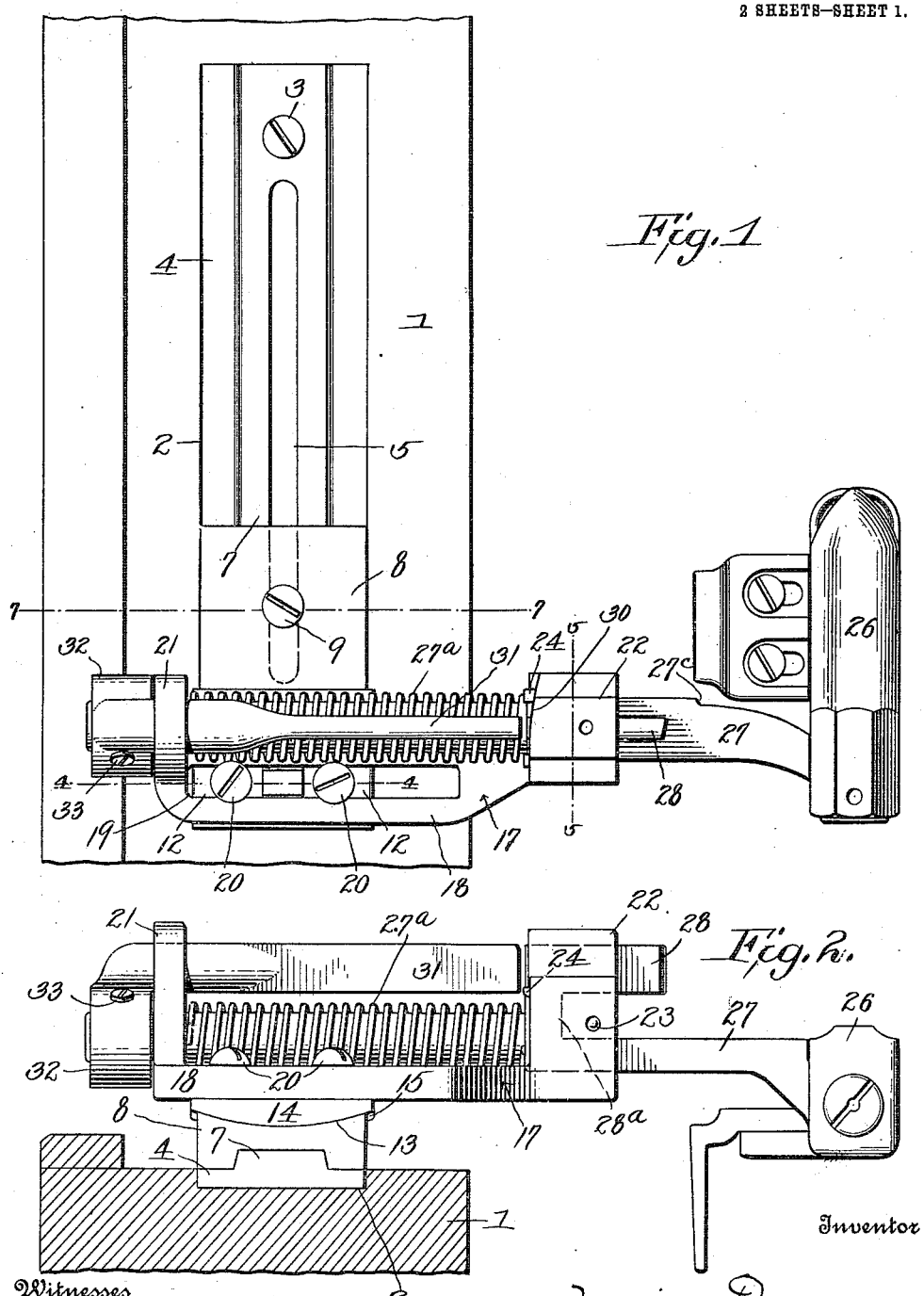

N. DEMERS.
LOOM TEMPLE.
APPLICATION FILED SEPT. 26, 1910.
995,333.
Patented June 13, 1911.
2 SHEETS—SHEET 2.
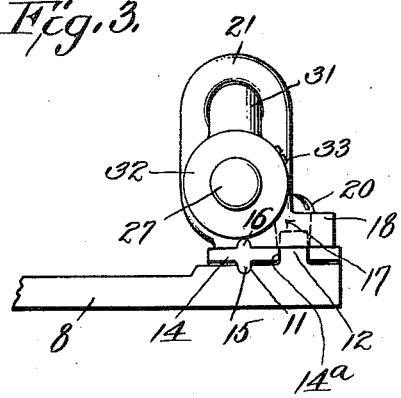
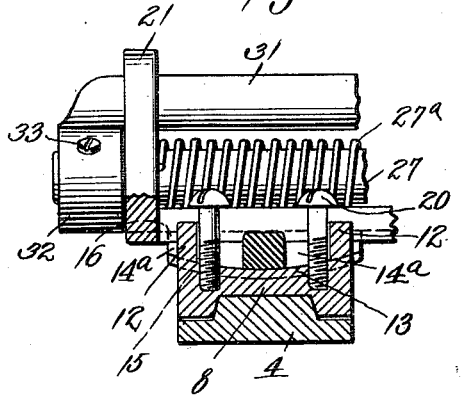
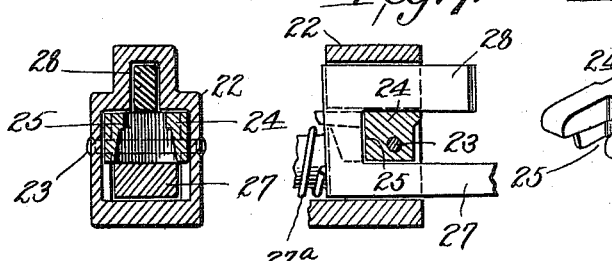
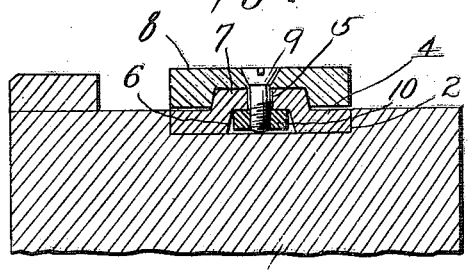

UNITED STATES PATENT OFFICE.

NAZAIRE DEMERS, OF MANCHESTER, NEW HAMPSHIRE.

LOOM-TEMPLE.

995,333.     Specification of Letters Patent.     Patented June 13, 1911.

Application filed September 26, 1910. Serial No. 583,900.

*To all whom it may concern:*

Be it known that I, NAZAIRE DEMERS, citizen of the United States, residing at Manchester, in the county of Hillsboro and State of New Hampshire, have invented new and useful Improvements in Loom-Temples, of which the following is a specification.

My present invention has to do with loom temples.

One of the objects of the invention is the provision in a loom temple, of means for securing the temple head in retracted position in such manner that there is no liability of the temple head being casually released and impelled forward by the spring.

Another object is the provision of a loom temple of such construction that there is no liability of the temple head and its shank being accidentally disconnected from the stand and permitted to drop between the breast beam and lay.

Another object is the provision in a loom temple, of a stand supported in such manner that it can be quickly and easily adjusted to raise or lower the temple head, as occasion demands.

Other advantageous characteristics of the invention will be fully understood from the following description of the preferred specific embodiment thereof, and the novel combinations will be definitely claimed.

In the drawings, accompanying and forming part of this specification: Figure 1 is a plan of my novel temple as properly arranged on the breast-beam of a loom. Fig. 2 is an elevation showing the outer side of the temple and also showing the outer end of the base plate. Fig. 3 is a rear elevation of the temple and base plate. Fig. 4 is a detail vertical section taken in the plane indicated by line 4—4 of Fig. 1, and illustrating the manner in which the rocker block is arranged relative to the base plate and the temple stand. Fig. 5 is a detail cross-section taken in the plane of line 5—5 of Fig. 1. Fig. 6 is a detail perspective view of the block that is pivoted in the forward bearing of the stand. Fig. 7 is a detail vertical section, taken in the plane indicated by the line 7—7 of Fig. 1, and showing the manner in which I prefer to connect the base plate with the breast beam. Fig. 8 is a detail plan illustrative of the manner in which the blade on the shank of the temple head can be made to abut against the rear side of the forward bearing on the stand to retain the said head in its retracted position. Fig. 9 is a sectional elevation illustrating the relative arrangement of the blade 28, the shank 27, the portion 28$^a$ and the block 24.

Similar numerals designate corresponding parts in all of the views of the drawings, referring to which:

1 is the breast beam of a loom.

In the present and preferred embodiment of my invention I provide a longitudinal recess 2 in the upper side of the breast beam, and in said recess I secure by a screw 3 a plate 4 that is longitudinally slotted at 5 and is provided in its underside with a channel 6, and on its upper side with a raised portion 7.

8 is the base plate of my novel temple. This base plate 8 is channeled at its underside to fit over the raised portion 7 of plate 4 and is connected with said plate 4 through the medium of a bolt 9 and a nut 10; the latter being located and movable in the channel 6 of plate 4. From this it follows that the base plate 8 and the temple thereon can be adjusted on the breast beam according as wider or narrower cloth is being woven. The outer portion of the base plate 8 is comparatively thick and is provided with a channel 11 and with upwardly extending projections 12. The upper side of the said outer portion is concave in the direction of its width, as indicated by 13, to receive the convex underside of the rocker block 14, which block is bifurcated at its forward and rear ends, as indicated by 14$^a$, to receive the projections 12 and screws, presently described, and is provided with a depending projection 15 and an upstanding projection 16; the depending projection 15 being disposed in the channel 11 of base plate 8.

On the flat upper side of the rocker block 14 is placed the temple stand 17 which has a channel in its underside to receive the projection 16 of the rocker-block 14. The projections 15 and 16 are preferably provided on the rocker-block 14 in order to hold said block against lateral movement without interfering with its adjustment forward and rearward. At its outer side the stand 17 is provided with a lateral portion 18 in which is a longitudinal slot 19. This slot 19 receives the projections 12 of the base plate 8 and also serves for the passage of screws 20 which connect the stand to the base plate 8 and pass loosely through the bifurcations 14ª in the rocker block 14. When the screws 20 are loosened, the block 14 can be quickly and easily moved forward to raise the temple head or rearward to lower the temple head, and after either adjustment of the temple head vertically to the cloth line, the screws 20 can be readily tightened to fix the stand, rocker block and base plate with respect to each other.

At its rear end the stand 17 is provided with a bearing 21 having lower and upper apertures, and at its forward end the stand is provided with a bearing 22, the upper portion of which is reduced in width, Fig. 5. In the lower and comparatively wide portion of the bearing 22 is secured by a transverse pin 23 a block 24, the rear portion of which is bifurcated, as indicated by 25 and best shown in Fig. 6. The said block 24 serves merely to offer an abutment and limit the forward movement of the upright portion 28ª between the blade 28 and the shank 27.

The temple head 26 and its appurtenances may be of the ordinary construction or of any other construction consonant with the purpose of my invention, and its shank 27 is extended through the forward bearing 22 of the stand, below the block 24, and is also extended through the lower aperture of the rear bearing 21. Surrounding the shank 27 and interposed between an abutment thereon and the rear bearing 21 is a coiled spring 27ª, designed to yieldingly hold the temple head in its forward, working position. The shank 27 is equipped with means movable into and out of the upper portion of the bearing 22 and adapted to abut against the rear side of said bearing to retain the temple head in its retracted position. In the present instance the said means is in the form of a blade 28 which is integral with the shank and is designed when moved rearward out of the bearing, to be moved laterally out of alinement with the passage through the bearing and then released, whereupon it will abut against the rear side of the bearing and effectually prevent accidental forward movement of the temple head under the action of the spring 27ª. This will be appreciated as materially advantageous when it is borne in mind that after the temple head is moved back and locked in the retracted position to enable the weaver to remove a miss pick, there is no liability of the temple head being casually released and impelled forward by the spring, even when the temple has been in use for a considerable period and wear of the parts has taken place. To further insure against casual release of the retracted temple head, I prefer to bevel the rear side of the bearing 22 forwardly from one side of the upper passage through said bearing, as indicated by 30 in Fig. 8, so that the blade 28 must be moved rearward with the shank 27 in order to move it laterally from the position shown in Fig. 8 to a position in alinement with the passage through the forward bearing 22. In the latter position the blade 28 will obviously move lengthwise in the said passage and serve as a guide to prevent turning of the shank 27 about its axis while the temple head is in use. The shank 27 is further provided with means for guarding the spring 27ª—i. e., preventing tearing of the clothes of the operator in the said spring, and for bringing up against the rear bearing 21. In the present instance the said means is in the form of a bar 31, movable lengthwise and laterally in the upper aperture of the bearing 21 and having a collar 32 that is fixed by a set screw 33 on the shank 27, at a point in rear of the rear bearing 21. By virtue of this provision, it will be manifest that should the pin which holds the block 24 in the forward bearing 22 break, the collar 32 will serve, by bringing up against the rear side of the bearing 21 to prevent displacement of the temple head and its shank from the stand 17. This will be noted as an important advantage when it is stated that heretofore the breaking of the pin that holds the block 24 in the forward bearing 22 has generally been followed by dropping of the temple head and shank and breaking of or damage to the same between the breast-beam and the lay.

When my novel temple is in use, the blade 28 is disposed and movable lengthwise in the upper portion of the bearing 22, and the upright portion 28ª, between said blade and the major part of the shank 27, is disposed in the bifurcation of the blade 24.

When it is desired to lock the temple head back—i. e., secure the temple head in retracted position, the temple head is pushed back against the action of the spring 27ª, and is then turned to put the blade 28 back of the bearing 22 and at one side of the passage through said bearing.

As will be noted from the foregoing the projections 15 and 16 on the rocker block and the projections 12 on the base plate serve to guide the rocker block and the temple stand when the same are moved forwardly and rearwardly.

By reference to Fig. 1 it will be seen that the forward portion of the temple shank 27 is abruptly reduced in width as indicated by 27ᶜ. This permits of the shank, when retracted, being moved laterally in order to put the blade 28 back of the bearing 22.

Having described my invention, what I claim and desire to secure by Letters-Patent, is:

1. In a loom temple, the combination of a stand comprising a rear bearing, a forward bearing, and means secured in the forward bearing and dividing the same into lower and upper passages; the rear side of the said forward bearing being beveled forward from one side of the upper passage therein, a temple head having a shank guided in the lower portion of the rear bearing and the lower passage of the forward bearing, and also having a blade movable into and out of the upper passage in the forward bearing and adapted to abut against the beveled rear side of the upper portion of said forward bearing, and further having an upright portion intermediate the shank and blade and adapted to bring up against the said means, a bar movable through the upper portion of the rear bearing and joined to the shank in rear of said rear bearing, and a coiled spring surrounding the shank and interposed between the rear bearing and the upright portion that extends between the shank and the blade.

2. In a loom temple, the combination of a stand having a bearing and means secured in said bearing and dividing the same into lower and upper passages and also having the rear side of the said bearing beveled forward from one side of the upper passage therein, a temple head having a shank guided in the lower passage of said bearing, and a blade movable into and out of the upper passage of the bearing and adapted to abut against the beveled rear side of the upper portion of the bearing, and also having an upright portion intermediate the shank and blade and adapted to bring up against the said means secured in the bearing, and a spring for yieldingly holding the temple head in its forward position.

3. In a loom temple, the combination of a stand having a bearing and means secured in said bearing and dividing the same into lower and upper passages, a temple head having a shank guided in the lower passage of the bearing and also having a blade movable into and out of the upper passage of said bearing and adapted to abut against the rear side thereof, and also having an upright portion intermediate the shank and blade and adapted to bring up against the said means secured in the bearing, and a spring for yieldingly holding the temple head in its forward position.

4. In a loom temple, the combination of a base plate having a concave upper side and upwardly extending projections arranged one in front of the other and spaced apart on said side, a rocker block convex at its under side and flat at its upper side and having bifurcations in its ends receiving said projections, a stand carrying a temple head and having a slotted portion receiving said projections, and screws extending through the slotted portion of the stand and the bifurcations of the rocker block and into the base plate.

In testimony whereof I have hereunto set my hand in presence of two subscribing witnesses.

NAZAIRE DEMERS.

Witnesses:
J. A. BOIVIN,
A. M. GILBERT.

---

Copies of this patent may be obtained for five cents each, by addressing the "Commissioner of Patents, Washington, D. C."